(12) United States Patent
Edwards et al.

(10) Patent No.: US 6,862,560 B1
(45) Date of Patent: Mar. 1, 2005

(54) MACHINING SIMULATION METHOD AND APPARATUS

(75) Inventors: William Richard Victor Edwards, Sheffield (GB); Fenquian Lin, Sheffield (GB)

(73) Assignee: MachineWorks Limited, Sheffield (GB)

( * ) Notice: Subject to any disclaimer, the term of this patent is extended or adjusted under 35 U.S.C. 154(b) by 0 days.

(21) Appl. No.: 09/490,222

(22) Filed: Jan. 24, 2000

(30) Foreign Application Priority Data

Jan. 29, 1999 (GB) .............................. 9901887

(51) Int. Cl.⁷ ................................................ G06G 7/48
(52) U.S. Cl. .............................. 703/7; 700/97; 700/98; 700/176; 700/184
(58) Field of Search .............................. 703/7; 700/97, 700/98, 176, 184

(56) References Cited

U.S. PATENT DOCUMENTS

| | | | | |
|---|---|---|---|---|
| 4,789,931 A | * | 12/1988 | Kuragano et al. | 700/176 |
| 5,101,363 A | | 3/1992 | Rutkowski | 703/7 |
| 5,128,870 A | * | 7/1992 | Erdman et al. | 700/163 |
| 5,272,642 A | * | 12/1993 | Suzuki | 700/182 |
| 5,317,519 A | | 5/1994 | Maeda | 700/184 |
| 5,351,196 A | * | 9/1994 | Sowar et al. | 700/182 |
| 5,594,651 A | * | 1/1997 | St. Ville | 700/98 |
| 5,703,782 A | * | 12/1997 | Dundorf | 700/182 |
| 5,710,709 A | * | 1/1998 | Oliver et al. | 700/184 |
| 5,967,205 A | * | 10/1999 | Welsh et al. | 144/117.1 |
| 6,341,996 B1 | * | 1/2002 | Brien et al. | 451/8 |
| 6,363,298 B1 | * | 3/2002 | Shin et al. | 700/160 |
| 6,459,952 B1 | * | 10/2002 | Dundorf | 700/182 |

FOREIGN PATENT DOCUMENTS

| | | |
|---|---|---|
| EP | 0 513 369 | 8/1991 |
| WO | 98/09203 | 3/1998 |

OTHER PUBLICATIONS

Boussac, S.; Crosnier, A. "Swept volumes generated from deformable objects application to NC verification," Proceedings of the IEEE International Conference on Robotics and Automation, 1996, pp. 1813–1818 vol. 2.*

Zhou Ming; Li Jianguang; Yuan Zhejun; Tan Jiubin, "Study on simulation system for 3–axis NC milling," Proceedings of the 22nd International Conference on Industrial Electronics, Control, and Instrumentation, IEEE IECON, vol.: 1, 1996 pp.: 637–640.*

Jerard et al., "Methods for Detecting Errors in Numerically Controlled Machining of Sculptured Surfaces", IEEE Computer Graphics and Applications, vol. 9, issue 1, Jan. 1989, pp. 26–39.*

* cited by examiner

Primary Examiner—Hugh Jones
Assistant Examiner—Herng-der Day
(74) Attorney, Agent, or Firm—Adams Evans, P.A.

(57) ABSTRACT

A machining simulation method using a plurality of equally sized regular volumes such as cubes to represent the surface of a raw stock object at a relatively low resolution. Each regular volume contains a reference to that portion of the original stock surface falling within that regular volume. The regular volumes affected by the swept volume of each tool movement are readily determined, and a pointer to that tool movement is added to each affected regular volume. The finished data may be expanded in detail at any portion of interest to create fully realised surface geometry with full boundary information by combining the original stock surface and the relevant surfaces of each tool movement. The original stock object may be displayed using the low-resolution regular volumes from any convenient view point, and may be animated in real time to show the effects of each tool movement.

13 Claims, 5 Drawing Sheets

MACHINING SIMULATION METHOD AND APPARATUS

FIELD OF THE INVENTION

The present invention relates in general to the field of computer graphics and simulation methods for representing solid objects, and in particular to a method for simulating and evaluating a machining process.

BACKGROUND TO THE INVENTION

In the field of numerically controlled (NC) machining a machine tool repeatedly passes over a stock. Commonly, a milling tool is used to mill the surface of the stock, thereby removing a small volume of the stock. A typical NC machining process involves of the order of 250,000 individual tool movements, and sometimes many more.

When a new machining process is developed a number of problems may occur, including, for example, unwanted collisions between the machine tool and the stock, and unexpected machining errors resulting in too much or too little material being removed from the stock. Traditionally a new machining process is verified by performing a test milling on a soft, inexpensive material. However, this testing process is expensive and time consuming, and analysis is limited to observational techniques.

More recently, simulation methods have been developed for simulating the movements of the tool with respect to the stock. Each movement of the tool is referred to as a sweep, and the volume represented by one sweep of the tool is known as the swept volume. In a typical simulation method the original volume of the stock is determined and then iteratively reduced by subtracting the swept volume of each tool movement from the original raw stock. However, known methods suffer significant problems in terms of processing speed and memory requirements.

SUMMARY OF THE INVENTION

It is an aim of at least preferred embodiments of the present invention to provide a method for simulating machining which operates quickly, accurately and with efficient use of memory.

Further, known methods are directed toward simulating single-axis machining processes. It is desired in preferred embodiments of the invention to provide a method capable of simulating and analysing multiple axis machining, with efficient use of memory and good processing speed.

Further still, known simulation methods are view dependent. That is, the view point relative to the stock must be set prior to the machining simulation process and results can only be viewed from that view point. To get a different view the machining simulation process must be repeated from a new view point. It is desired in preferred embodiments of the invention to provide a method for simulating machining which is view independent.

Another aim of the preferred embodiments of the invention is to provide a method for simulating machining where results are readily displayed in a 2D graphical format and readily animated. The preferred view-independent method is desired to allow animation to be interrupted at any point, for the view point to be rotated, and then for animation and results to continue without requiring any re-processing of the machining simulation process.

According to the present invention there is provided a method for simulating machining, comprising the steps of:

(a) determining a plurality of regular volumes containing surfaces of an object representing a raw stock;
(b) determining a subset of said plurality of regular volumes coincident with a swept volume representing a tool movement;
(c) applying a pointer to each said regular volume of said subset, said pointer referring to said tool movement.

Preferably, said method comprises the step (d) of repeating said steps (b) and (c) for each tool movement of a predetermined plurality of tool movements.

Preferably, the step (a) comprises the steps of (a1) receiving 3D object data representing a raw stock; and (a2) transforming the 3D object data to produce a transformed 3D object dataset including a plurality of regular volumes each containing a reference to a surface element of the raw stock.

The input 3D object data representing the raw stock is transformed into a modelling format in said step (a) preferably by segmenting the object into a plurality of regular volumes. Any predetermined geometry may be used to select the regular volumes. In the preferred embodiment a Cartesian system is employed, i.e. an XYZ grid, to give a plurality of parallelpiped volumes preferably of regular size and most preferably cuboid. Preferably, the resolution of the regular volumes is selected appropriate to the machining process being simulated.

Preferably, said input 3D object data is transformed such that the regular volumes are arranged to contain sections of the surfaces of the raw stock. That is, each regular volume relates to a section of the surface of original raw stock. In this way a modelling data format is achieved having a plurality of regular volumes representing the positions of the surfaces of the original raw stock, each regular volume being linked, preferably by a stock surface pointer, to the original surface data. Said stock surface pointer is preferably a pointer referring to a plane equation describing said surface of the original raw stock occurring within said regular volume.

Preferably, said step (b) comprises (b1) determining a swept volume for said tool movement in a co-ordinate space equivalent to a co-ordinate space for the plurality of regular volumes. For the or each said tool movement, the step (b) comprises (b2) determining a set of said regular volumes wholly or partially within the swept volume. That is, a first-level evaluation is made to determine the set of regular volumes through which the tool passes during that tool movement. Advantageously, this first level evaluation may be performed quickly and using minimal memory requirements because the swept volume is determined in the same co-ordinate space as the plurality of regular volumes, and the regular volumes are each a very simple geometric structure such as a cube.

Preferably, in said step (c) a tool movement pointer is attached to each of said set of regular volumes referring to the respective tool movement. Preferably, each regular volume has one or more tool movement pointers attached thereto. In the preferred embodiment the surfaces of the swept volume representing the tool movement are known. Preferably the tool movement pointer refers to one or more known surfaces of said swept volume coincident with said regular volume.

Preferably, a method comprising the step (e) displaying a 3D object comprising the plurality of regular volumes on a human visible display.

Preferably, the simulation method comprises a later expanding step (f). Preferably said step (f) comprises, for each regular volume, determining a finished surface by combining the original raw stock surface with the surfaces referred to by the tool movement pointer or pointers associated with that regular volume. Preferably, the original raw stock surface is combined with surfaces of the swept volume of the or each tool movement affecting that regular volume.

In the preferred expanding step only an area of finished stock that is of particular interest is expanded. For example, only areas of the finished stock where potential tool conflict has being identified are expanded, giving a significant saving in processing speed and memory requirements.

Preferably, the expanded data results in a fully realised surface geometry representation with full boundary information. This final 3D object dataset is conveniently stored for later use or displayed in any suitable output form, conveniently on a 2D display device such as a CRT monitor or a printer.

Advantageously, the method allows a first level "lazy" evaluation, whereby data representing the finished stock at the end of the machining process is obtained very quickly and efficiently with minimal processing and minimal memory requirements. The finished stock is held in a low-resolution modelling data format referring to the surfaces of the original raw stock and the relevant surfaces of the swept volume of each tool movement.

The use of the tool movement pointer is particularly advantageous in allowing rapid processing with minimal memory requirements by providing a reference to the known swept volume of that tool movement, i.e. without storing the geometry of the swept volume.

According to a second aspect of the present invention there is provided a method for transforming input 3D object data representing a raw stock to produce a transformed 3D object dataset, said transforming method comprising the steps of:
1) applying an XYZ grid at a predetermined orientation with respect to the stock object;
2) for an XY cell of said XYZ grid, determining a surface boundary of the stock object in the Z direction;
3) determining regular grid values in the Z direction to give a parallelepiped volume having maximum and minimum Z values containing the surface boundary of the stock object.

Preferably, these steps are repeated for each XY cell within a predetermined area to give a list of parallelepiped regular volumes each containing a surface boundary of the stock object. Preferably, a separate regular volume is determined for each surface boundary occurring in the Z direction for each XY cell.

Preferably, a surface pointer is determined for each said regular volume. Initially, the surface pointer is determined from the input 3D object data representing the surface of the raw stock. The surface type is represented in any suitable format, and preferably is a reference to a known surface.

Preferably, the method also includes the step of determining a next type identifier with reference to the surface orientation of the surface boundary. Suitably, the next type identifier is selected to represent either solid or void. Further preferably the next type identifier is selected to be one amongst adjacent, solid or void.

Preferably, the method also includes the step of applying a next pointer determining the position of the next regular volume in the Z direction that contains a surface boundary.

Preferably, the method for machining simulation uses said transforming method to produce said transformed 3D dataset in said step (a).

Preferably, the plurality of regular volumes form a list, each regular volume comprising a position field, a surface pointer field, a next type field and a next regular volume pointer.

Preferably, the surface pointer field of each regular volume comprises an original stock surface pointer or one or more tool surface pointers.

The present invention also extends to an apparatus having means for performing each of the method steps described herein. The apparatus may be a general purpose computer programmed to perform the method. Further, the present invention extends to a computer readable medium having recorded thereon instructions for performing the method steps described herein.

BRIEF DESCRIPTION OF THE DRAWINGS

For a better understanding of the invention, and to show how embodiments of the same may be carried into effect, reference will now be made, by way of example, to the accompanying diagrammatic drawings, in which.

DETAILED DESCRIPTION

Figure 1:
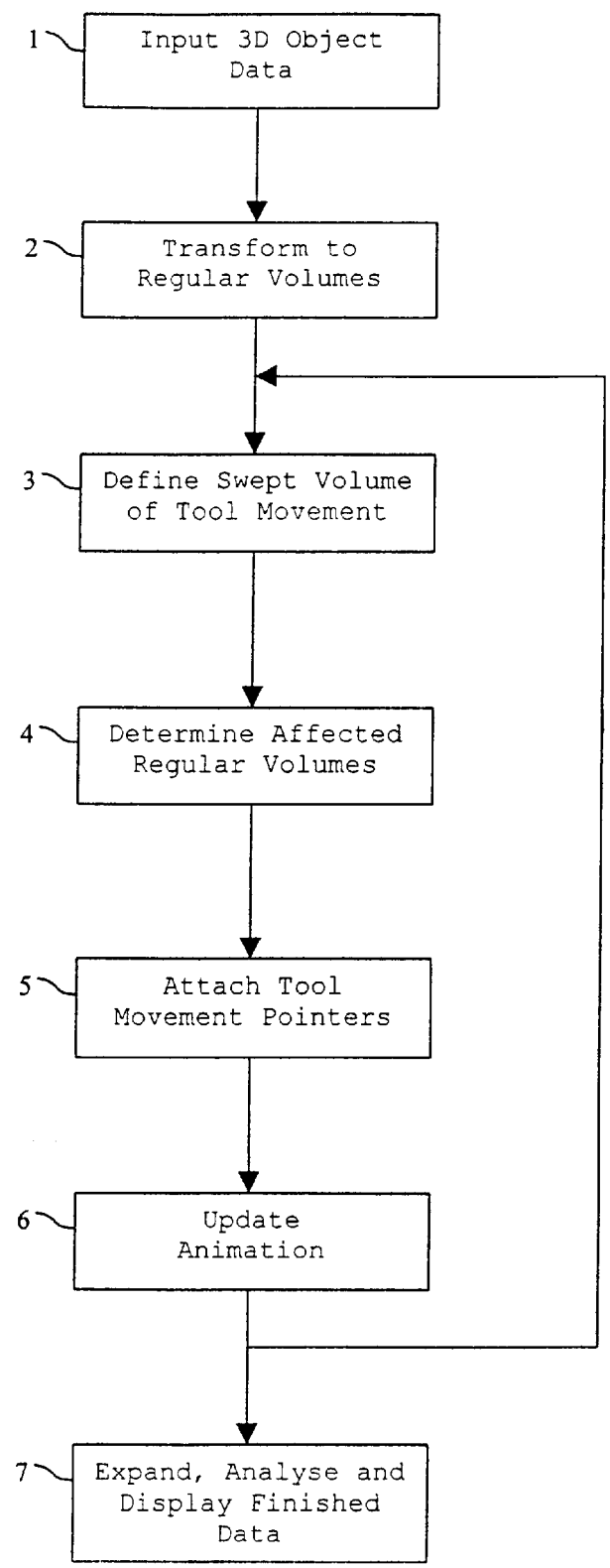
FIG. 1 is a flowchart illustrating an overview of the machining simulation method according to a preferred embodiment of the invention.

Referring to FIG. 1, a flowchart is shown giving an overview of the preferred embodiment of the machining simulation method.

A 3D object dataset representing the raw stock is received at step 1. This 3D object dataset is transformed in step 2 to produce a modelling dataset. This modelling dataset will be termed an "extended voxel" format. In the modelling dataset the surface of the raw stock object is defined in terms of a large number of relatively small elements. Each of these small elements, termed herein "regular volumes", is a small volume containing a small section of the surface of the stock object.

In step 3 a cut function is performed to determine a swept volume of a tool movement. The machining tool moves from a start position to an end position. The machining tool is known to have a predetermined size and configuration and the path of the tool from the start point to the end point readily determines the swept volume relating to that tool movement.

In step 4 the parts of the raw stock that are affected by the tool movement are determined, by comparing the swept volume with the regular volumes that represent the object surface. The regular volumes that are completely contained within the swept volume are destroyed by the tool movement. Where the swept volume creates a new surface within the stock object, e.g. where the existing surface is completely removed and the tool cuts a new surface into the stock object, new regular volumes are created to represent that new surface. However, it is a feature of typical machining methods to remove only a relatively small surface layer of the stock in any one tool movement. Most commonly the regular volumes, which represent the surface of the object, will partly intersect with the swept volume. Therefore, the new shape of the surface of the stock can be represented by combining the original surfaces with the new surfaces of the tool movement.

In step 5 a tool movement pointer is attached to each of the affected regular volumes determined by step 4. Suitably, the tool movement pointer refers to a surface of the tool movement which coincides with the regular volume. This step will be described in more detail later.

Step 5 is repeated for each regular volume affected by the tool movement, i.e for each of a set of affected regular volumes as determined by step 4.

Steps 3, 4 and 5 are repeated for each tool movement of a predetermined set of tool movements. In a typical example machining process up to around 500,000 individual tool movements must be processed. The most complicated processes currently have of the order of 1 million tool movements, but this is expected to rise even further in future. However, the method described herein advantageously allows even very large processes to be simulated quickly and with minimal processing, by the use of pointers referring to relevant tool surfaces.

Optionally, at step 6 a real-time animation of the machining simulation may be updated to show the results of the tool movement determined by steps 3, 4 and 5.

The finished data combining all of the tool movements is conveniently stored for future use in any suitable temporary or permanent storage means. This finished data represents the finished stock after completion of the machining process. The data is in the extended voxel format comprising a relatively large set of regular volumes determining the position of the surfaces of the finished stock, together with pointers to the relevant original stock surfaces and tool movement surfaces.

In step 7, the finished data is expanded to give fully realised surface information for analysis and display in any convenient manner.

The machining method will now be described in more detail, starting with the transforming step 2 of FIG. 1, which will be explained with reference to FIGS. 2, 3, 4 and 5.

Figure 2:
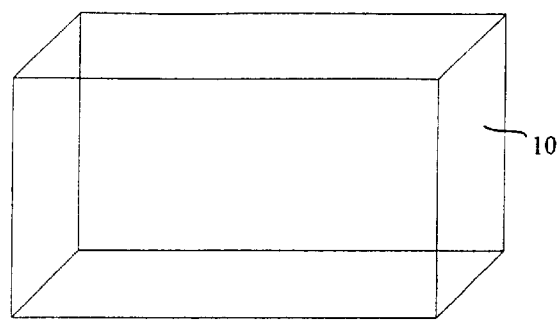
FIG. 2 is a schematic diagram showing an example raw stock object.

Referring to FIG. 2 of the accompanying drawings, the preferred embodiment of the machining simulation method is intended to operate on any suitable raw stock object 10. The object 10 shown in FIG. 2 is merely a convenient simplified example for the purposes of illustrating the invention. The practical embodiments of the invention are intended to cope with even a relatively complicated original stock object as may be formed, for example, by a casting or moulding operation.

The object data representing the raw stock can be supplied in any suitable representation format. Such format includes, for example, constructive solid geometry wherein complex objects are represented by the sum or difference of many simple objects. Alternatively, the input 3D object data may be in the form of a mesh of simple and complex polygons.

Figure 3:
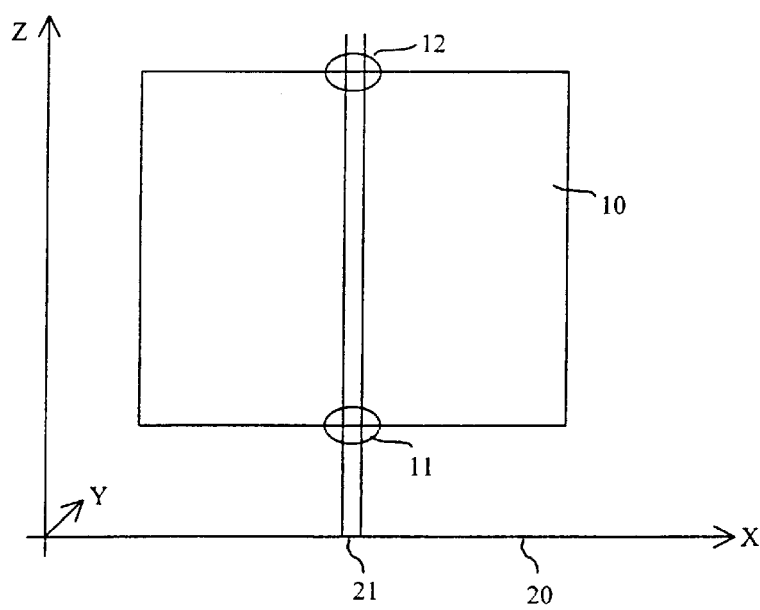
FIG. 3 is a schematic diagram illustrating the transforming method according to a preferred embodiment of the invention.

Referring now to FIG. 3, the input 3D object data representing the raw stock 10 is transformed into a modelling format by segmenting the object into a plurality of regular volumes. Any predetermined geometry is used to select the regular volumes. For example, a spherical object is conveniently represented using polar coordinates. However, in the example of FIG. 3 a Cartesian system is employed, i.e. an XYZ grid, to give a plurality of parallelepiped volumes.

Using the XYZ grid 20 shown in FIG. 3, a first XY cell 21 is selected at any convenient location. Typically the method moves along from one end of the stock. However, an example mid-point location is shown in FIG. 3 for ease of illustration.

A first surface boundary 11 of the raw stock object 10 is determined with reference to the Z direction, to give an XYZ location of the surface boundary 11.

Figure 4:
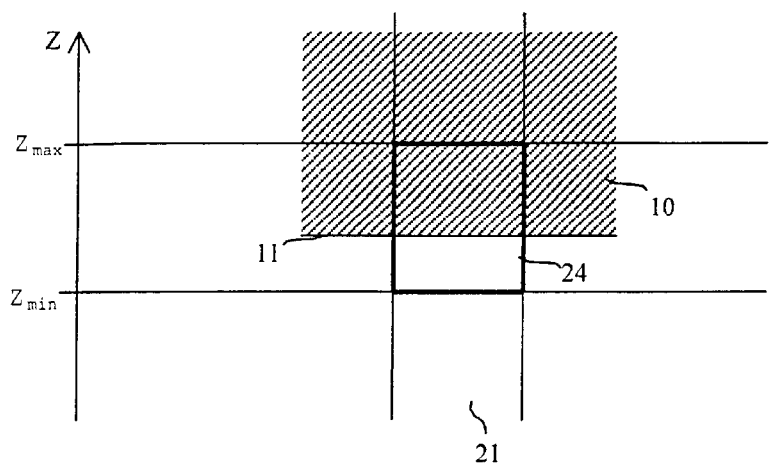
FIG. 4 is an expanded view of a portion of FIG. 2.

Referring to FIG. 4, an expanded view of the surface boundary 11 is shown. The position of the object boundary 11 in the Z direction falling within the selected XY cell 21 is determined closest to predetermined regular intervals on the Z axis such that the object boundary 11 occurs within a cuboid volume defined by the location of the XY cell 21 and values Zmin and Zmax. Thus, the position of the object boundary 11 is known to occur within the simplified regular volume, in this example determined by the position of the XY cell and the height values Zmin and Zmax in the Z direction.

Next, the regular volume 24 is associated with a pointer referring to a plane equation describing the exact geometry of the surface of the object boundary 11. Such plane equations will be familiar to persons skilled in the art and are commonly used to represent 3D object data.

In the simplest embodiment, the object boundary 11 occurring within the regular volume 24 contains only one surface and therefore a pointer to only one plane equation representing that surface is required. However, in alternate embodiments the 3D object data may contain more than one facet within the regular volume 24, in which case the stored pointer or pointers refer to each facet, i.e. each surface, occurring within the regular volume 24 with reference to the plane equation describing that surface, together with information determining the intersection of said surfaces.

Advantageously, the XYZ grid is selected so as to minimise surface intersections occurring within any one regular volume 24. Intervals along the X, Y and Z axis are selected according to any convenient spacing. In the preferred embodiment the intervals are equally spaced. However, other arrangements are envisaged such as a variable spacing depending on the resolution required in any particular area.

The resolution of the XYZ grid is suitably determined according to the level of the detail desired in the simulation. However, as the spacing of intervals in the XYZ grid is decreased thereby increasing the number of regular volumes, the memory requirements of the method are increased. Further, the processing speed of the method is decreased as the number of regular volumes is increased. However, even though a greater number of regular volumes requires greater initial processing, there can be benefits in terms of faster analysis and visualisation of the finished data. The skilled person will appreciate the trade off that applies here and select the resolution accordingly.

Conveniently, a next type identifier is associated with each of the regular volumes 24. The next type identifier is selected to show whether the next cell in the Z direction is solid or void, i.e. whether the surface boundary 11, 12 is going into the stock or coming out of the stock as progress is made in the Z direction.

Referring to the example of FIG. 3, in this case the regular volume 24 containing the object boundary 11 represents a change from a void state into a solid state as progress is made in the Z direction, i.e. going into the stock. Therefore, the next type identifier associated with the regular volume 24 is set to represent "solid".

In the preferred embodiment, the next type identifier is selected to be one amongst adjacent, solid or void. The "adjacent" type determines that the next regular volume in the Z direction is located at the immediately adjacent interval along the Z axis and also contains a surface boundary.

Referring again to FIG. 3, the steps described above are repeated to determine a regular volume for each surface boundary 11, 12 in the Z direction for the selected XY cell 21. This process is repeated again for each such XY cell within a predetermined area until the whole of the raw stock object 10, or at least a desired portion thereof, is represented in said extended voxel format, i.e. in terms of a list of regular volumes.

Figure 5:
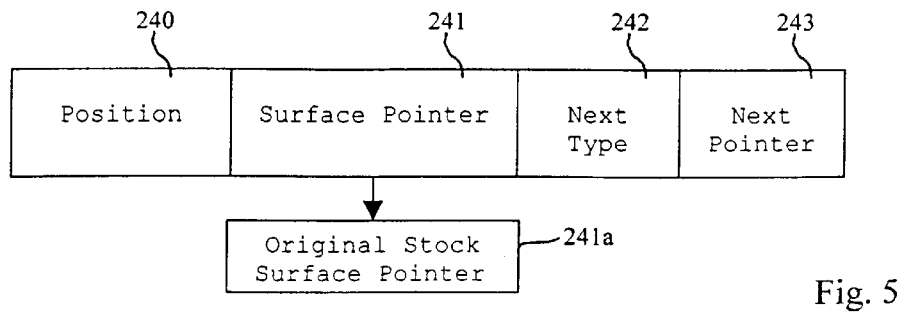
FIG. 5 is a schematic diagram illustrating a regular volume used in the preferred machining simulation method.

FIG. 5 shows the information recorded to describe each regular volume. This information includes a position information 240 representing the position of the regular volume, one or more surface pointers 241 referring to the plane equation or equations which describe the object boundary occurring within the regular volume, and the next type identifier 242. Initially, the stock surface pointer(s) 241a refer to the original stock surface or surfaces within the regular volume. Conveniently the position information 240 contains an XY reference to the position of the XY cell 21 and height information based on the values of Zmin and Zmax. Each regular volume also suitably includes a next pointer 243 representing the position of the next regular volume in the Z direction.

Advantageously, by determining the position of surface boundaries data representing relatively large areas of solid or void is not required, and memory requirements are significantly improved.

Steps 3, 4 and 5 of the method illustrated in FIG. 1 will now be described in more detail with reference to FIGS. 6 to 12.

Figure 6:
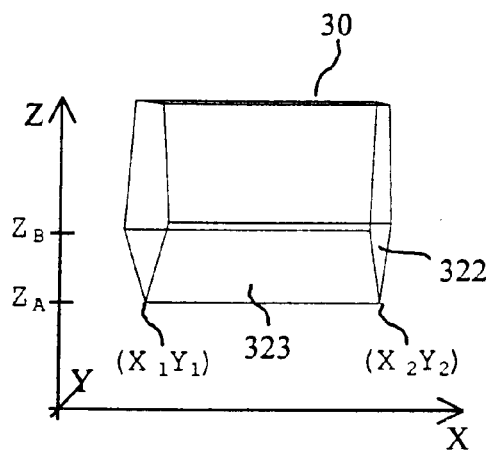
FIG. 6 is a schematic view of an example tool movement.

Referring to FIG. 6, an example tool movement 30 is shown. The shape of the tool has been simplified for ease of explanation and the scale for FIG. 6 is not intended to correspond to the scale of FIG. 2 or 3.

In a typical machining simulation environment, the machine tool is arranged to move primarily along a first axis with displacements in one or two axes perpendicular thereto. This is commonly referred to as 2½ or "3" axis machining. Conveniently the Z axis of the XYZ grid 20 is aligned parallel with the primary axis of the machine tool, which simplifies processing requirements. However, any convenient alignment may be chosen and the method is not restricted to use in alignment with the primary tool movement axis. Indeed, this freedom is a significant advantage of the described met hod.

As shown in FIG. 6, the tool is moved from a start point $(X_1, Y_1, Z_1)$ to an end point $(X_2, Y_2, Z_2)$ thus determining the swept volume 30. Typically the tool comprises a tool head displacing a relatively large volume arranged to support a working tool piece displacing a relatively small volume. The working tool piece is intended to contact the stock object and perform, for example, a milling operation.

The working toolpiece may take any suitable form. Examples include working tools having a flat end, a ball end, or, as shown, an angular end profile.

The swept volume 30 is represented in the form of a plurality of surfaces which, in the example shown, are conveniently elongate planar surfaces and therefore described by relatively simple plane equations. In this example the side surfaces are each a simple planar rectangle and the end surfaces are simple pentagons.

Figure 7:
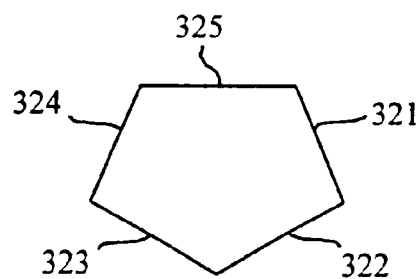
FIG. 7 is schematic end view of an example tool movement.

FIG. 7 shows the swept volume 30 in end view, wherein the side surfaces are labelled 321–325.

Figure 8:
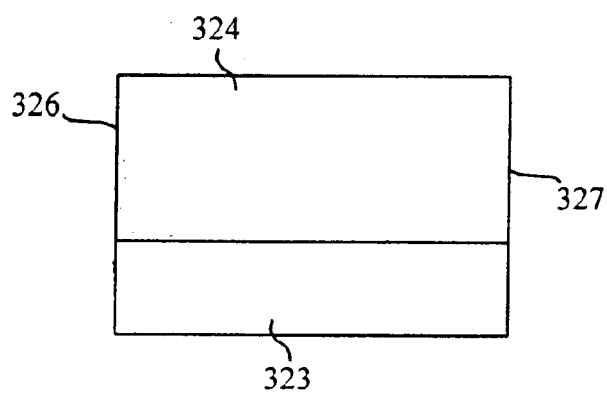
FIG. 8 is a schematic side view of an example tool movement.

FIG. 8 is a side view of the swept volume 30 with the end surfaces labelled 326 and 327, respectively.

Referring again to FIG. 6, the XY cells affected by the swept volume 30 are readily determined by projecting the swept volume onto the XY plane.

For each of these XY cells, the regular volumes 24 affected by the swept volume 30 are determined with reference to the start $(X_1, Y_1, Z_1)$ and end $(X_2, Y_2, Z_2)$ positions of the tool movement. The regular volumes that occur outside this range are not affected by this tool movement. Regular volumes wholly within this range are completely destroyed by this tool movement. Therefore, minimal processing is required to establish these two preliminary conditions.

It will be appreciated that the tool movement may take any orientation with respect to the XYZ grid of FIG. 6. Here, the tool area is obtained by projecting the swept volume on to the XY plane to thereby determine the XY cells affected by that tool movement. Similarly, the swept volume is projected onto the Z axis to determine the minimum and maximum height values affected. In the example of FIG. 6 the angular tool has downwardly directed surfaces 322 and 323 within the height range $Z_A$ to $Z_B$. Therefore, regular volumes within this height range will be affected by these surfaces of this tool movement.

Figure 9:
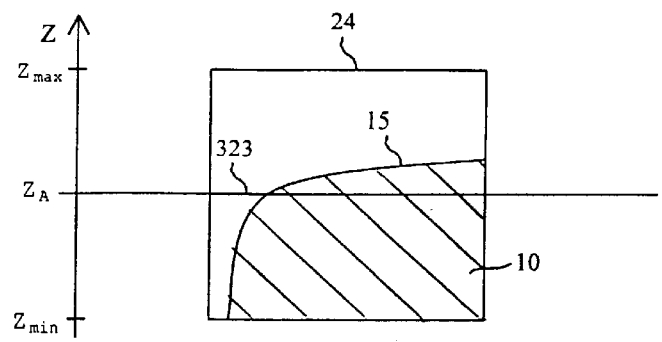
FIG. 9 is a schematic side view of an example regular volume.

Referring to FIG. 9, another example regular volume 24 is shown for illustration. In this example the regular volume 24 is shown in two dimensions representing a side-on view. In practice the preferred embodiment operates on three dimensional data.

As shown in FIG. 9, the regular volume 24 is associated with a reference to a surface of the raw stock, illustrated by line 15, with the solid interior of the stock 10 shown cross-hatched. The values Zmin and Zmax for the regular volume 24 are known. In this example, the swept volume 30 is known to have a height $Z_A$ which falls within the range Zmin to Zmax. Therefore a reference to the relevant surface of the tool movement is added to the regular volume 24. This reference, termed herein a "tool surface pointer", is a reference, for example, to the surface 323 of the tool movement 30 shown in FIGS. 6, 7 and 8.

Figure 9A:
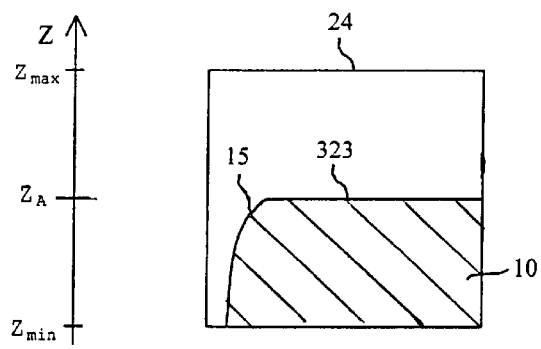
FIG. 9a is a schematic side view of an example regular volume having a section of the original stock been removed by a milling operation.

By combining the references to the original stock surface 15 and the tool movement surface 323, the resultant finished surface is obtained. As shown in FIG. 9a, this example tool movement has removed a section of the original stock, such as by a milling operation.

Figure 10:
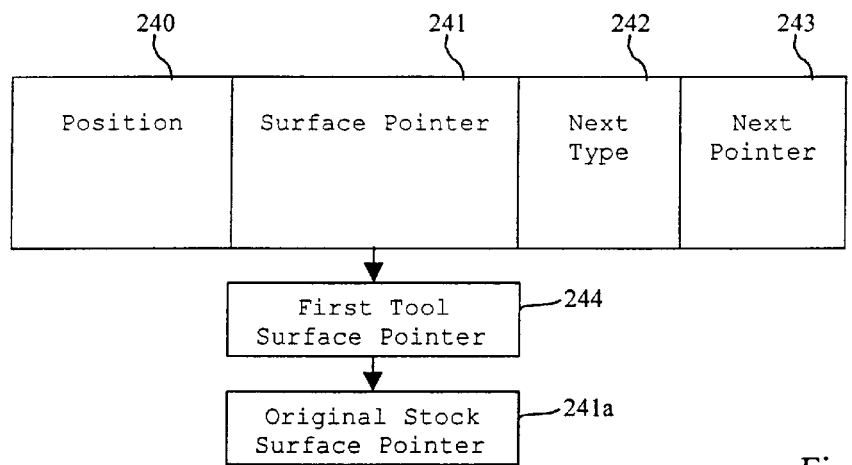
FIG. 10 shows data stored in relation to a first example regular volume.

Referring to FIG. 10, the data representing the regular volume 24 is supplemented to include a first tool surface pointer 244 in addition to the original stock surface pointer 241a. That is, in the example of FIGS. 9 and 9a, the stock surface pointer 241a is a reference to surface 15 of the original stock, and the first tool surface pointer 244 is a reference to the surface 323 of the tool movement 30.

FIG. 9 illustrates an example where the original stock surface 15 intersects with one surface of the tool movement.

This is a relatively simple example of one of the many possible outcomes. Other example outcomes will now be described with reference to FIG. 11.

Figure 11:
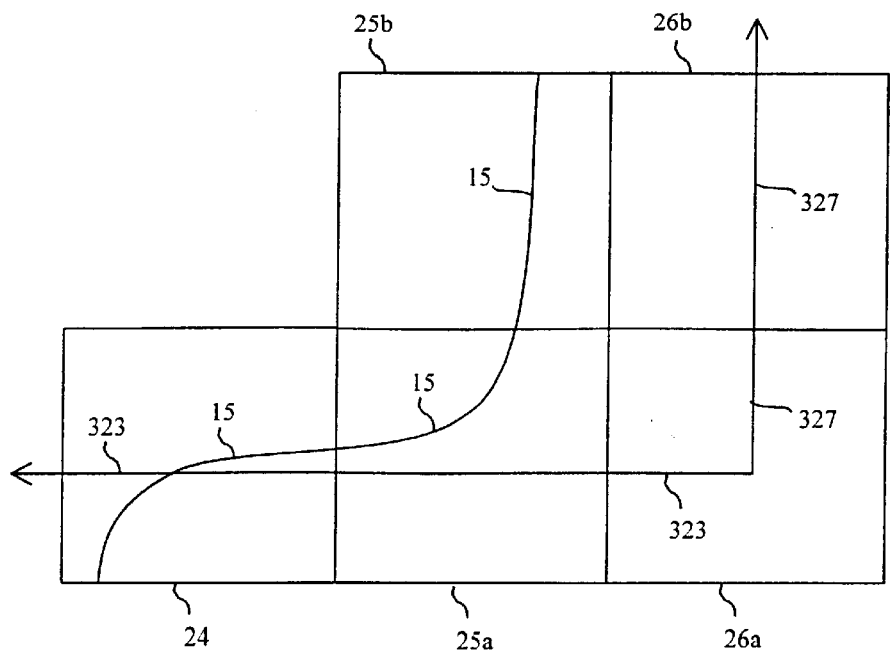
FIG. 11 is a schematic side view of a group of example regular volumes.

FIG. 11 shows a group of regular volumes including three that are numbered 24, 25a and 25b which contain references to portions of the original stock surface 15. Consistent with FIG. 9, the regular volume 24 is coincident with one surface 323 of the swept volume 30 and the data for this regular volume 24 is updated to contain a reference to both of these surfaces.

Regular volume 25a is updated to add a first tool surface pointer referring to the surface 323 of the swept volume 30.

Regular volume 25b is completely within the swept volume 30 and is therefore destroyed.

Regular volumes 26a and 26b are newly created to represent the action of the tool movement 30. Regular volume 26a is created with a reference to the side surface 323 and to the end surface 327, whilst regular volume 26b contains only a reference to the end surface 327 of the swept volume 30.

Figure 12:
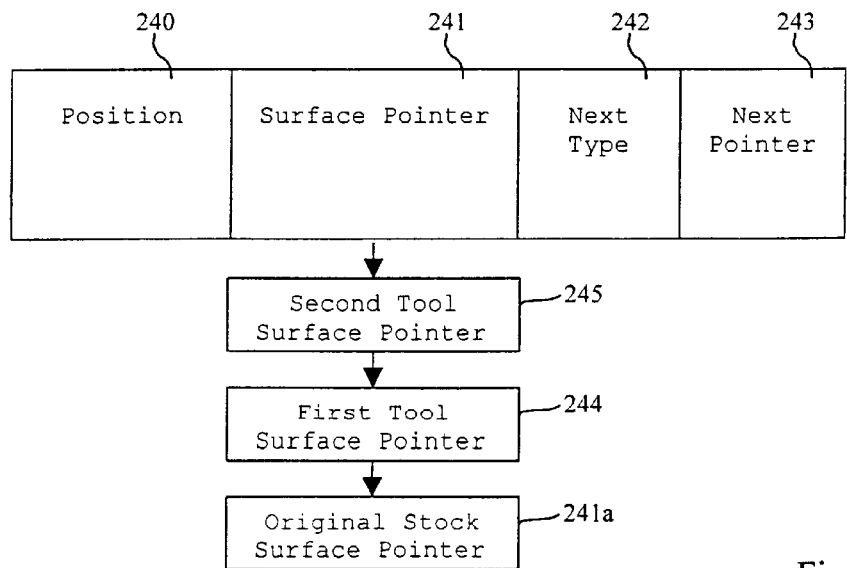
FIG. 12 shows data stored for a second example regular volume.

As shown in FIG. 12, the data for a regular volume such as regular volume 26a of FIG. 11 contains a first tool surface pointer 244 referring, for example, to the side surface 323 and a second tool surface pointer 245 referring, for example, to the end surface 327. In this example the stock surface pointer 241a is not relevant and remains empty, or is not present.

Once all of the tool movements of a predetermined set of tool movements have been processed, using the method described above, a set of finished stock data is obtained.

Conveniently, an image represent ing the finished stock is displayed taken directly from the finished stock data in the extended voxel format. That is, a low resolution image is readily generated from the position data 240 for each of the regular volumes. This image is conveniently displayed on any suitable image display device such as a 2D CRT monitor or a printer, for visual analysis by the user. Optionally, this low resolution image is formed and updated during the simulation process.

In the field of machining simulation it is desired to carefully analyse the finished stock data to, for example, locate faults in the machining process. Common faults include clashes wherein the tool unintentionally collides with part of the raw stock. This happens most commonly during rapid repositioning movements of the tool. Such collisions can cause significant damage to the tool and the stock. Such collisions can also result in a significant injury risk for users due to flying debris. Therefore machining simulation methods are used to identify potential collisions so that the machining process can be altered before use in practice.

A second common error is the removal of too much material from the stock, known as gouging. It is desired to compare the finished stock with an ideal finished product, to perform a target part comparison.

Thirdly, it is desired to maximise efficiency of the machining process and avoid, for example, removing very little material in any one cut which increases the overall number of cuts required, or removing too much material in any one cut which reduces tool lifetime and can result in machine failure.

A machining simulation method is desired to locate these and other errors in a machining process. Therefore a machining simulation method is an important tool for the skilled user who can analyse the results obtained and make appropriate changes to the machining process. The benefit of these changes can then be confirmed by repeating the simulation method in relation to the new process.

As mentioned above the method described herein allows a low resolution image to be generated and displayed very quickly. This image can be easily manipulated, for example to change the view point, because the position data is generated without reference to the end user's desired view point.

To allow the user to perform detailed analysis, it is desired to provide fully realised geometry detailing the surface of the finished stock. However, typically it is desired to view only a relatively small section of the stock in relatively high detail, for example to examine an area where a problem as occurred. Therefore, only a relatively small visible area of the stock surface need be fully realised.

The finished stock data is expanded by combining, for each regular volume, the surfaces referred to by the stock surface pointer and first, second and subsequent tool surface pointers. These surfaces can then be rendered using known techniques, such as a ray tracing technique, to provide data suitable for display as a visual output for the user.

Importantly, since data need only be expanded for a relatively small visible area, the application of animation techniques become possible allowing the user to see a visual representation of successive tool movements affecting that visible area. This is a significant improvement because traditional animation techniques run at some 10 to 100 times slower than non-animated static image techniques.

Advantageously, the finished stock data contains full information relating to all the tool movements which are relevant to the surface of the finish stock. Therefore highly accurate final surface information is obtained, without any approximations being made.

It will be appreciated that the method disclosed above has necessarily been simplified for ease of explanation. The skilled person will appreciate that the method applies equally to more complicated geometries and to more complicated surfaces and combinations of surfaces.

In this disclosure there are shown and described only the preferred embodiments of the invention, but it is to be understood that the invention is capable of changes and modifications within the spirit and scope of the invention as defined by the following claims.

What is claimed is:

1. A method for machining simulation, comprising the steps of:
   (a) determining a plurality of regular volumes containing surfaces of an object representing a raw stock;
   (b) determining a subset of said plurality of regular volumes coincident with a swept volume representing a tool movement, including the steps of:
      (b1) determining a swept volume for the tool movement in a co-ordinate space common to both the swept volume and the plurality of regular volumes;
      (b2) determining a subset of the plurality of regular volumes wholly or partially within the swept volume of that tool movement; and
      (b3) creating one or more new regular volumes representing a portion of the swept volume not coincident with at least one of the plurality of regular volumes, and adding the new regular volumes to the plurality of regular volumes; and
   (c) applying a pointer to each said regular volume of said subset, said pointer referring to said tool movement.

2. The method as claimed in claim 1, comprising the step:

(d) repeating the steps (b) and (c) for each tool movement of a predetermined plurality of tool movements.

3. A method as claimed in claim 2, wherein the step (a) comprises the steps of:

(a1) receiving 3D object data representing a raw stock; and (a2) transforming the 3D object data to produce a transformed 3D object dataset including a plurality of regular volumes each containing a reference to at least one surface of the raw stock.

4. A method as claimed in claim 1, wherein the step (b2) comprises:

(b21) determining those regular volumes of the subset which are wholly within the swept volume; and (b22) determining those regular volumes of the subset which are partially within the swept volume and thereby coincident with a surface of the swept volume.

5. A method as claimed in claim 4, wherein the step (c) comprises attaching a tool movement pointer to each of said subset of regular volumes, the tool movement pointer referring to the tool movement.

6. A method as claimed in claim 5, wherein the tool movement pointer refers to a surface of the swept volume of the tool movement coincident with that regular volume.

7. A method as claimed in claim 6, wherein the tool movement pointer refers to a plane equation representing the surface of the swept volume of the tool movement.

8. A method as claimed in claim 1, comprising the step:

(e) displaying a 3D object comprising the plurality of regular volumes on a human visible display.

9. A method as claimed in claim 1, comprising the step:

(f) for each of selected regular volumes from the plurality of regular volumes, determining a fully realized finished surface by combining the surface of the raw stock contained within that regular volume with the tool movement referred to by the tool movement pointer applied to that regular volume.

10. A method as claimed in claim 9, wherein the step (f) results in a fully realized surface geometry representation with full boundary information as a final 3D object dataset.

11. A method as claimed in claim 10, wherein the step (f) comprises displaying the final 3D object dataset on a human visible display.

12. A method as claimed in claim 1, wherein the plurality of regular volumes form a list, each regular volume comprising a position field, a surface pointer field, a next type field and a next regular volume pointer.

13. A method as claimed in claim 12, wherein the surface pointer field of each regular volume comprises an original stock surface pointer or one or more tool surface pointers.

* * * * *